(12) United States Patent
Hashimoto et al.

(10) Patent No.: US 11,882,347 B2
(45) Date of Patent: Jan. 23, 2024

(54) IMAGE PICKUP APPARATUS AND ACCESSORY

(71) Applicant: CANON KABUSHIKI KAISHA, Tokyo (JP)

(72) Inventors: Yoshitaka Hashimoto, Kanagawa (JP); Takafumi Iwasaki, Kanagawa (JP); Hiroaki Inukai, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 231 days.

(21) Appl. No.: 17/499,277

(22) Filed: Oct. 12, 2021

(65) Prior Publication Data

US 2022/0030140 A1 Jan. 27, 2022

Related U.S. Application Data

(63) Continuation of application No. PCT/JP2020/015082, filed on Apr. 1, 2020.

(30) Foreign Application Priority Data

Apr. 24, 2019 (JP) .................. 2019-082494

(51) Int. Cl.
*H04N 23/50* (2023.01)
*H04R 5/033* (2006.01)

(52) U.S. Cl.
CPC ............. *H04N 23/50* (2023.01); *H04R 5/033* (2013.01); *H04R 2205/024* (2013.01); *H04R 2460/13* (2013.01); *H04R 2499/11* (2013.01)

(58) Field of Classification Search
None
See application file for complete search history.

(56) References Cited

U.S. PATENT DOCUMENTS

| 10,419,843 B1* | 9/2019 | Mehra .................. H04R 5/033 |
| 10,564,717 B1* | 2/2020 | Shahmohammadi ... G06F 3/015 |
| 2018/0303190 A1* | 10/2018 | Calilung ............... A42B 3/185 |

FOREIGN PATENT DOCUMENTS

| JP | 04-125621 A | 4/1992 |
| JP | 05-48941 A | 2/1993 |
| JP | 11-184006 A | 7/1999 |
| JP | 2001-008896 A | 1/2001 |
| JP | 2007-199259 A | 8/2007 |
| JP | 2009-272735 A | 11/2009 |
| JP | 2011-170784 A | 9/2011 |
| JP | 2018-194758 A | 12/2018 |
| WO | WO-2018093193 A1 * | 5/2018 ............. G02B 27/01 |

OTHER PUBLICATIONS

International Search Report dated Jun. 9, 2020 of the corresponding International Application, PCT/JP2020/015082 dated Apr. 1, 2020.

* cited by examiner

*Primary Examiner* — Rodney E Fuller
(74) *Attorney, Agent, or Firm* — Cowan, Liebowitz & Latman, P.C.

(57) ABSTRACT

An image pickup apparatus includes a camera main body, an eyepiece portion for viewing an object image, and a frame member having an opening through which light of the object image passes, and the eyepiece portion includes a bone conduction speaker.

22 Claims, 21 Drawing Sheets

IMAGE PICKUP APPARATUS AND ACCESSORY

CROSS-REFERENCE TO RELATED APPLICATIONS

This application is a Continuation of International Patent Application No. PCT/JP2020/015082, filed on Apr. 1, 2020, which claims the benefit of Japanese Patent Application No. 2019-082494, filed on Apr. 24, 2019, which is hereby incorporated by reference herein in their entirety.

BACKGROUND OF THE INVENTION

Field of the Invention

The present invention relates to an image pickup apparatus including a bone conduction speaker.

Description of the Related Art

Bone conduction is a technique that transmits vibration of sounds to auditory nerves via a skull, etc., so that words and sounds can be heard. Some mobile phones and headsets use the bone conduction technology so that sounds can be heard even when there is a loud noise around a user during a phone call, or even when a user has a hearing disability.

Some image pickup apparatuses have a function of transmitting information such as an explanation of an operation and a focusing sound for informing a user of a focusing state by a sound. Conventionally, in an image pickup apparatus, which is equipped with a sound output unit configured to transmit sounds to a user using airway sounds from a speaker or the like, it has been necessary to perform an operation such as lowering volume or muting a sound in an environment where the sound is desired not to be transmitted to the surroundings, and thus it has been difficult to certainly transmit audio information to the user. Therefore, for example, Japanese Patent Application Laid-Open No. ("JP") H5-48941 discloses a video camera provided with a bone conduction speaker.

However, in the video camera disclosed in JP H5-48941, the bone conduction speaker is disposed on a side surface of a camera unit or a VTR unit and is away from a finder, and thus depending on size and shape of a user's face, it is difficult to ensure that the bone conduction speaker is in contact with the face.

SUMMARY OF THE INVENTION

The present invention provides an image pickup apparatus and an accessory each of which can ensure that a bone conduction speaker is in contact with a user's face.

An image pickup apparatus according to one aspect of the present invention includes a camera main body, an eyepiece portion for viewing an object image, and a frame member having an opening through which light of the object image passes, and the eyepiece portion includes a bone conduction speaker.

An accessory according to another aspect of the present invention is detachably attachable to an image pickup apparatus, and includes an eyepiece portion and a frame having an opening through which light of the object image passes, and the eyepiece portion includes a bone conduction speaker.

Further features of the present invention will become apparent from the following description of exemplary embodiments with reference to the attached drawings.

DESCRIPTION OF THE EMBODIMENTS

Figure 1:
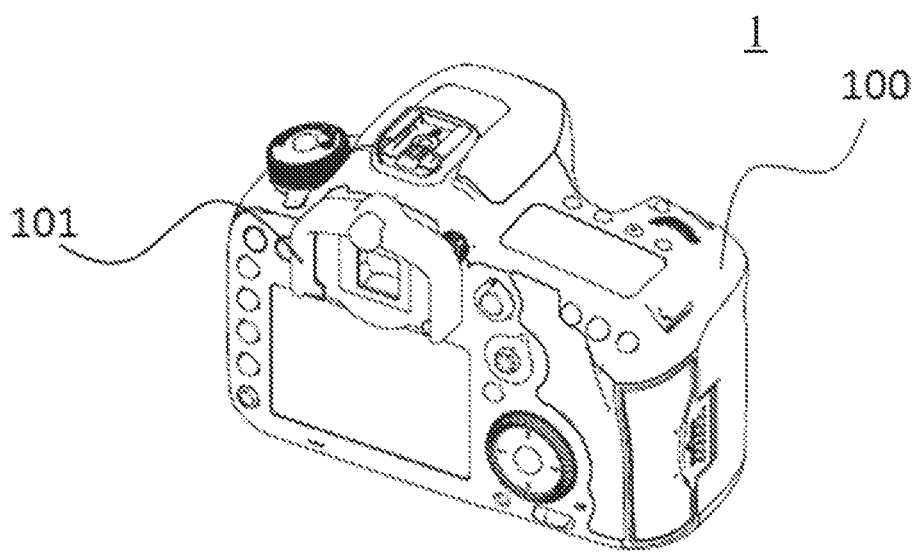
FIG. 1 is a perspective view illustrating an image pickup apparatus according to a first embodiment.

Referring now to the drawings, a detailed description will be given of embodiments according to the present invention.

First Embodiment

First, a description will be given of an image pickup apparatus according to the first embodiment of the present invention with reference to FIG. 1. FIG. 1 is a perspective view illustrating an image pickup apparatus 1. The image pickup apparatus 1 includes a camera main body 100 and an eyecup (accessory) 101 attached to the camera main body 100. The eyecup 101 is detachably attachable to the camera main body 100. That is, another compatible eyecup is attachable to the camera main body 100, and the eyecup 101 is attachable to another compatible camera main body. Each of the camera main body 100 and the eyecup 101 has a contact portion, and when the contact portions come into contact with each other, they are electrically connected to each other, and information can be transmitted from the camera main body 100 to the eyecup 101. A detailed description will be given later of a configuration of the contact portion of the eyecup 101.

Figure 2:
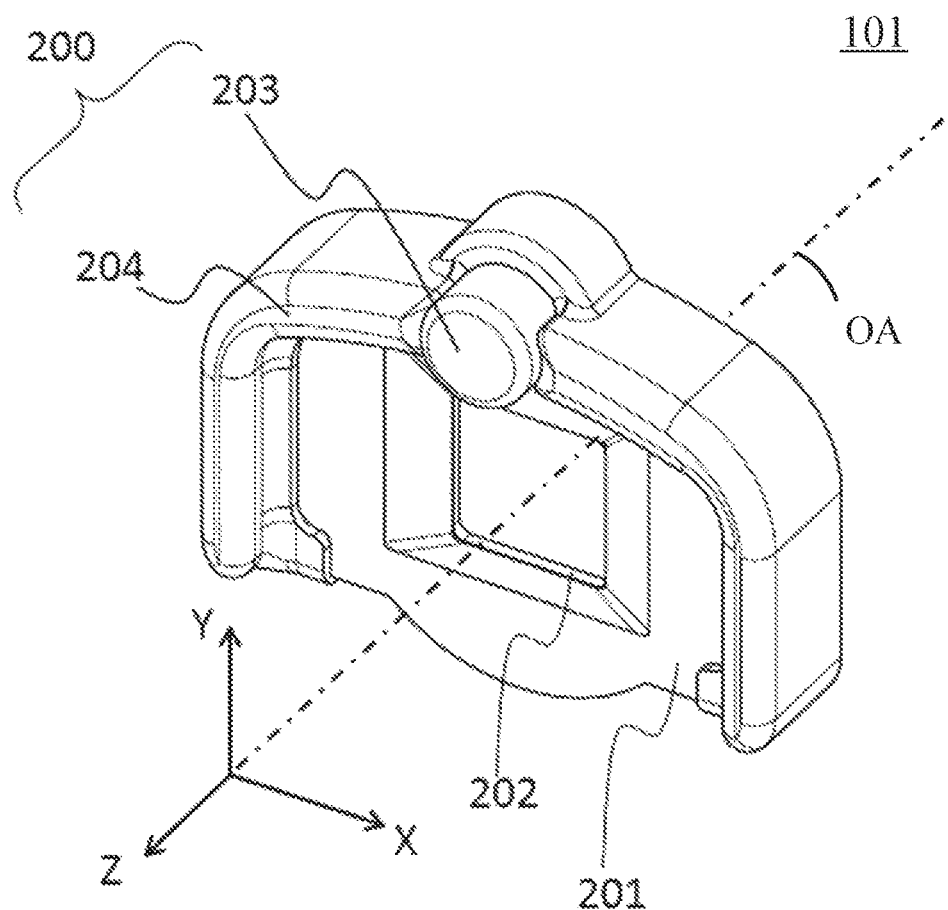
FIG. 2 is a perspective view illustrating an eyecup according to the first embodiment.

Next, the configuration of the eyecup 101 will be described with reference to FIG. 2. FIG. 2 is a perspective view illustrating the eyecup 101. In FIG. 2, a dot-dash-dot line represents a finder optical axis (center of an optical axis of a finder) OA. For the following description, X, Y, and Z axes are defined as illustrated in FIG. 2. The finder optical axis OA is defined as the Z axis, a horizontal axis orthogonal to the finder optical axis OA (Z axis) is defined as the X axis, and a vertical axis orthogonal to the Z axis is defined as the Y axis. Respective+directions of the axes are directions of arrows illustrated in FIG. 2, and an origin of the XY axes is a point on the finder optical axis OA.

The eyecup 101 includes an eyepiece portion 200 for viewing an object image and a frame member 201. The eyepiece portion 200 includes a bone conduction unit 203 and a light-shielding wall portion 204. The frame member 201 is formed with an opening 202 through which light of the object image pass so that a user can confirm a finder image.

In this embodiment, the bone conduction unit 203 is disposed on an upper part (upper side) of the opening 202. The bone conduction unit 203 is configured so that when the user views the object image, the bone conduction unit 203 comes into contact with an upper part of a user's eye and can transmit audio information from the camera main body 100 to the user. Thereby, when viewing the finder image, the user can obtain the audio information from the camera main body 100 by making the upper part of the eye in contact with the bone conduction unit 203.

The light-shielding wall portion 204 shields the opening 202 from entering light while an image is captured. The bone conduction unit 203 is configured to project in the +Z direction from the light-shielding wall portion 204. Thereby, when the user takes a look into the finder, the bone conduction unit 203 can come into contact with the user before the light-shielding wall portion 204 does.

Figure 3:
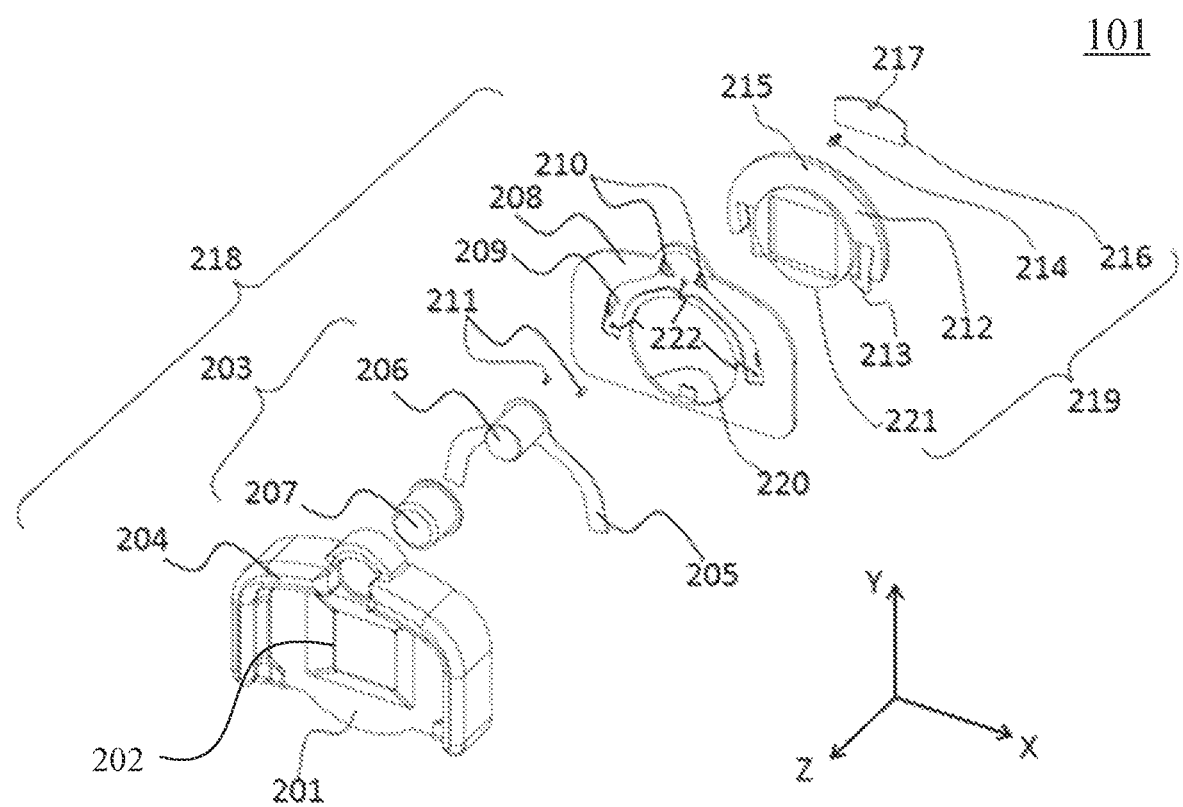
FIG. 3 is an exploded perspective view illustrating the eyecup according to the first embodiment.
Figure 4:
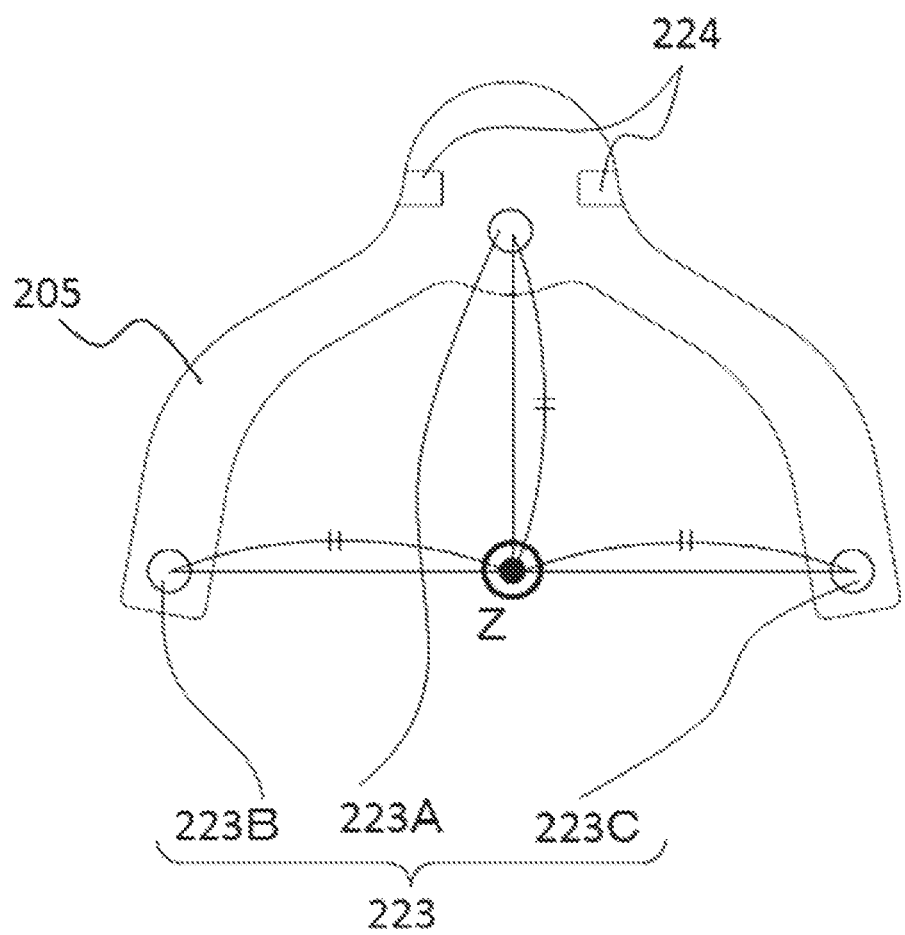
FIG. 4 is an explanatory diagram illustrating a flexible printed circuit board according to the first embodiment.
Figure 5:
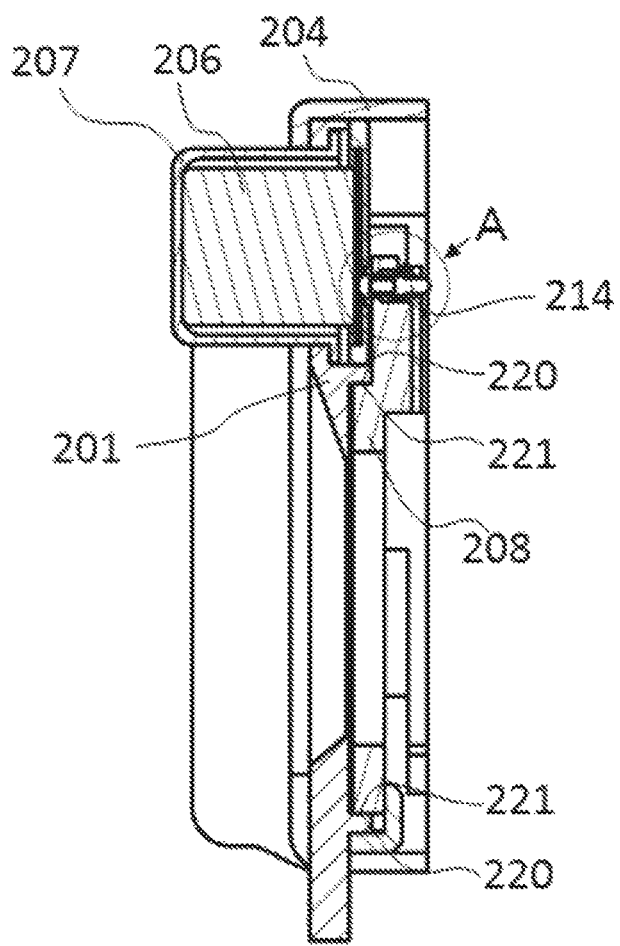
FIG. 5 is a sectional view in a YZ plane of the eyecup at a position of X=0 according to the first embodiment.
Figure 6:
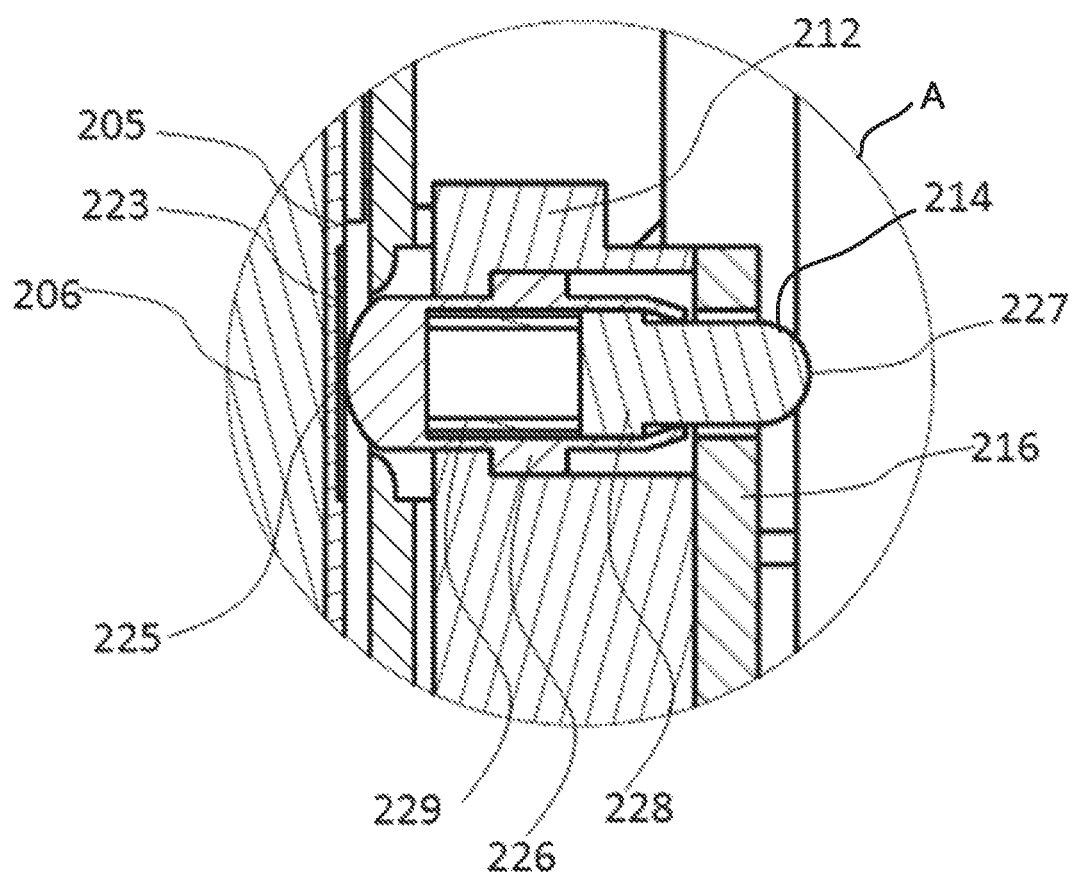
FIG. 6 is an enlarged view of an area A in FIG. 5.
Figure 7:
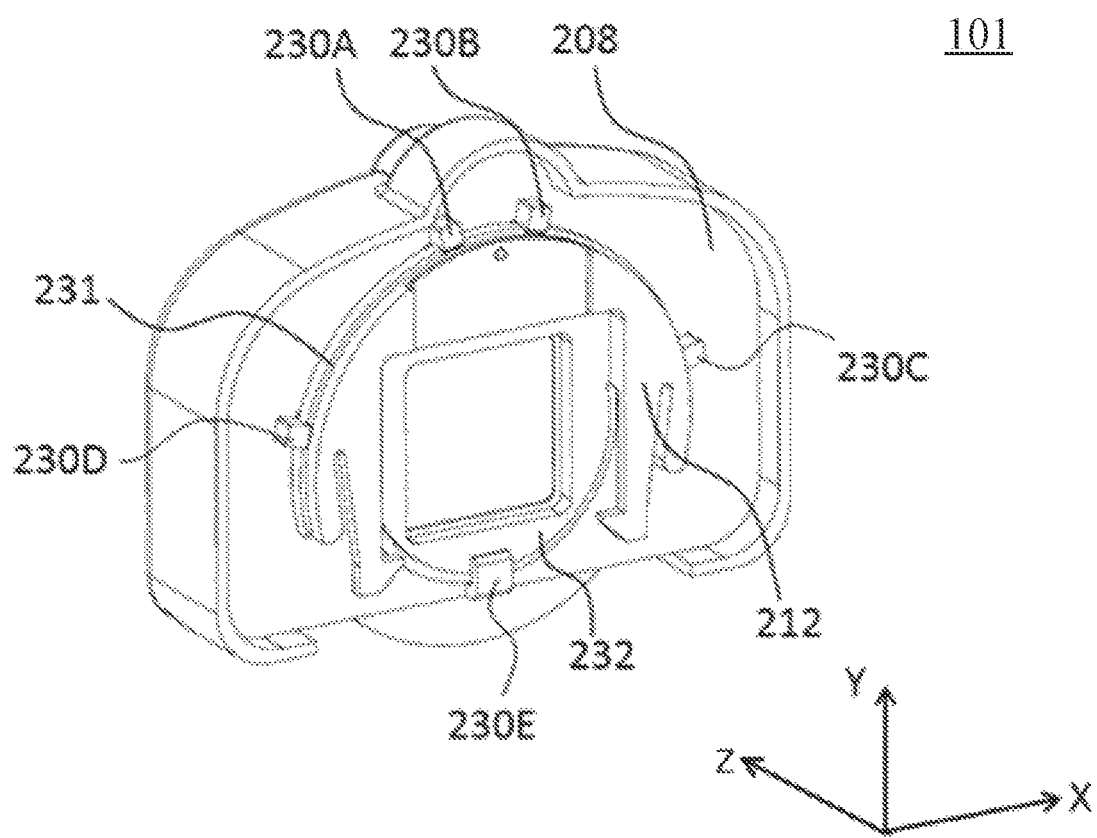
FIG. 7 is a perspective view illustrating the eyecup as viewed from a camera main body side according to the first embodiment.

Next, the configuration of the eyecup 101 will be described in detail with reference to FIGS. 3 to 7. FIG. 3 is an exploded perspective view illustrating the eyecup 101. FIG. 4 is an explanatory diagram illustrating a flexible printed circuit board 205. FIG. 5 is a sectional view illustrating the eyecup 101 in the YZ plane at a position of X=0. FIG. 6 is an enlarged view of an area A in FIG. 5. FIG. 7 is a perspective view illustrating the eyecup 101 in a view from the camera main body 100 side.

The bone conduction unit 203 includes a bone conduction speaker 206 which is mounted on the flexible printed circuit board 205 and gives vibration to a skull so that sounds are recognized, and a protection cap (protection member) 207 formed by an elastic member and configured to protect the bone conduction speaker 206. A holder 208 fixes the bone conduction unit 203 and the position in the XY directions of the bone conduction unit 203 is limited, the holder 208 having a flexible board storage portion 209 in which the flexible printed circuit board 205 is stored.

FIG. 4 schematically illustrates the flexible printed circuit board 205 viewed from the camera main body 100 side. The flexible printed circuit board 205 is provided with a contact pattern 223 at three locations including a contact pattern 223A used for a normal position and contact patterns 223B and 223C used for vertical positions. The contact patterns 223A, 223B, and 223C are substantially equidistant from the Z axis. Here, the "substantially equidistant from the Z axis" is not limited to a case where the distances from the Z axis are exactly the same, but includes a case where the distances are regarded as substantially the same (substantially equidistant) from the Z axis. The same applies in the following description. A straight line passing through the contact pattern 223A and orthogonal to the Z-axis is orthogonal to a straight line passing through the contact pattern 223B and orthogonal to the Z-axis, and is orthogonal to a straight line passing through the contact pattern 223C and orthogonal to the Z-axis.

A reinforcing plate 224 for receiving a biasing spring 211 is provided on a back surface of the bone conduction speaker 206 of the flexible printed circuit board 205. The bone conduction unit 203 is biased in the +Z direction by the biasing spring 211 disposed on a spring storage portion 210 of the holder 208. A position in the Z direction of the bone conduction unit 203 is limited by the light-shielding wall portion 204, but when the user presses the bone conduction unit 203, the position in the Z direction varies slightly. A base 212 has a pawl 213 used for being attached to the camera main body 100.

A contact 214 is sandwiched and fixed between the base 212 and a cover 216. The contact 214 passes through a hole 222 of the holder 208 and a hole 215 of the base 212, and is electrically connected to the contact pattern 223 of the flexible printed circuit board 205. Further, the contact 214 passes through a hole 217 of the cover 216 and is electrically connected to a contact portion (not illustrated) of the camera main body 100. Thus, the contact pattern 223 of the flexible printed circuit board 205 and the contact portion of the camera main body 100 are electrically connected via the contact 214.

As illustrated in FIG. 3, the eyecup 101 includes a holder 218 and a mount portion 219. The holder 218 includes the frame member 201, the bone conduction unit 203, the light-shielding wall portion 204, the biasing spring 211, and the holder 208. The mount portion 219 includes the base 212, the contact 214, and the cover 216. A circular inner wall portion 220 provided on the holder 208 and a circular wall portion 221 provided on the base 212 are in an engagement relationship, and the holder 218 (that is, the eyepiece portion 200) and the mount portion 219 are rotatable around the Z axis, i.e., around the finder optical axis OA.

As illustrated in FIG. 6, the contact 214 has a cylindrical portion 226 and a shaft portion 228. The cylindrical portion 226 has a spherical convex portion 225 which comes into contact with the contact pattern 223 of the flexible printed circuit board 205. The shaft portion 228 has a spherical convex portion 227 which contacts the contact portion of the camera main body 100. Inside the cylindrical portion 226, a spring 229 is provided which biases the cylindrical portion 226 and the shaft portion 228 in opposite directions in the Z direction. The spring 229 ensures that the contact 214 electrically connects the contact pattern 223 of the flexible printed circuit board 205 and the contact portion of the camera main body 100.

As illustrated in FIG. 7, the holder 208 has pawls 230A, 230B, 230C, 230D, and 230E. The base 212 has an outer circumferential arc portion 231 and a circular disk portion 232. The pawls 230A, 230B, 230C, and 230D face the outer circumferential arc portion 231 and the pawl 230E faces the circular disk portion 232, and the position of the holder 218 is limited so that the holder 218 does not separate in the Z direction from the mount portion 219.

Figure 8A:
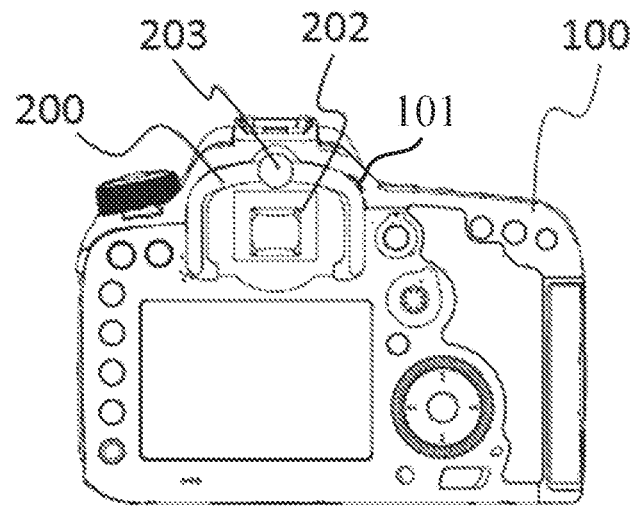
FIGS. 8A and 8B are diagrams illustrating a relationship between the camera main body and the eyecup in respective orientations of a normal position state and a vertical position state according to the first embodiment.
Figure 8B:
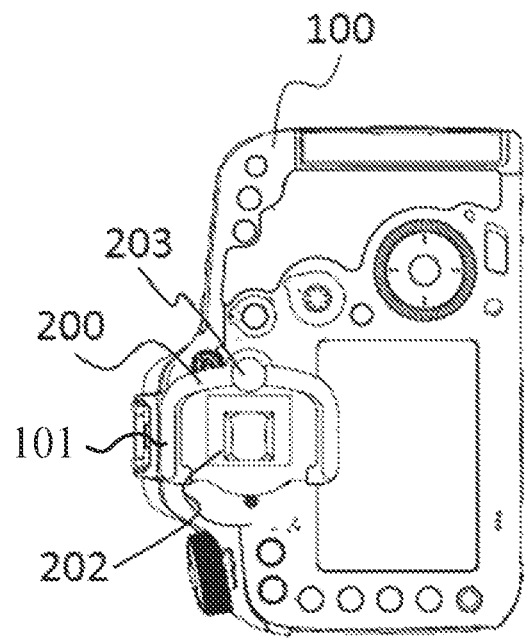

Next, a description will be given of a use of the image pickup apparatus 1 in a vertical position state with reference to FIGS. 8A to 10. FIGS. 8A and 8B are diagrams illustrating a relationship between the camera main body 100 and the eyecup 101 in respective orientations of a normal position state (horizontal position state) and a vertical position state. FIG. 8A illustrates the normal position state, and FIG. 8B illustrates the vertical position state. As illustrated in FIGS. 8A and 8B, the position of the bone conduction unit 203 with respect to the opening 202 does not change regardless of the orientation of the camera main body 100. Hence, regardless of whether the state is the normal position state or the vertical position state, when the user takes a look into the finder, the bone conduction unit 203 comes into contact with the same position on the face.

Figure 9A:
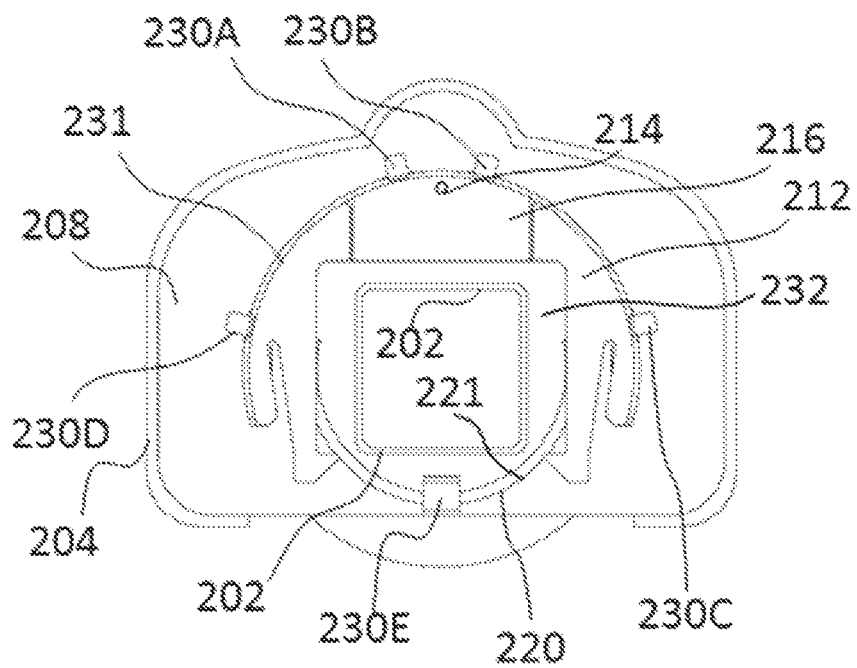
FIGS. 9A and 9B are diagrams illustrating the eyecup in respective orientations of the normal position state and the vertical position state as viewed from the camera main body side according to the first embodiment.
Figure 9B:
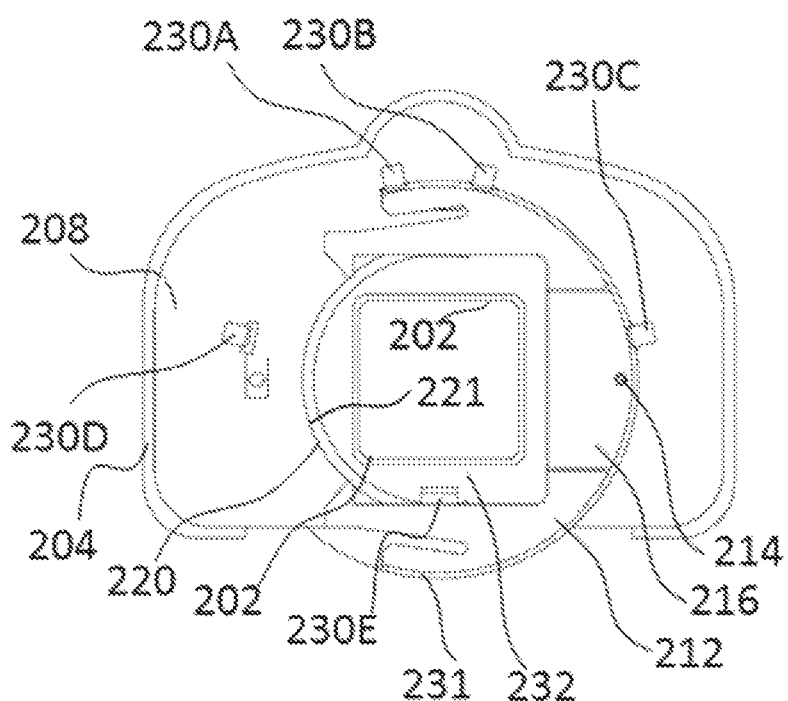

FIGS. 9A and 9B illustrate the eyecup 101 viewed from the camera main body 100 side in respective orientations of the normal position state and the vertical position state. FIG. 9A illustrates the same orientation state (normal position state) as in FIG. 8A, and FIG. 9B illustrates the same orientation state (vertical position state) as in FIG. 8B.

As described above, the inner wall portion 220 and the wall portion 221 have a circular engagement relationship centering on the finder optical axis OA. This causes holder 218 to rotate around the finder optical axis OA with respect to the mount portion 219. At this time, the pawl 230D is separated from the outer circumferential arc portion 231 but the position in the Z direction of the holder 218 is maintained by the pawls 230A, 230B, 230C, and 230E. The opening 202 has a substantially square shape and its orientation does not narrow the field of view.

Figure 10:
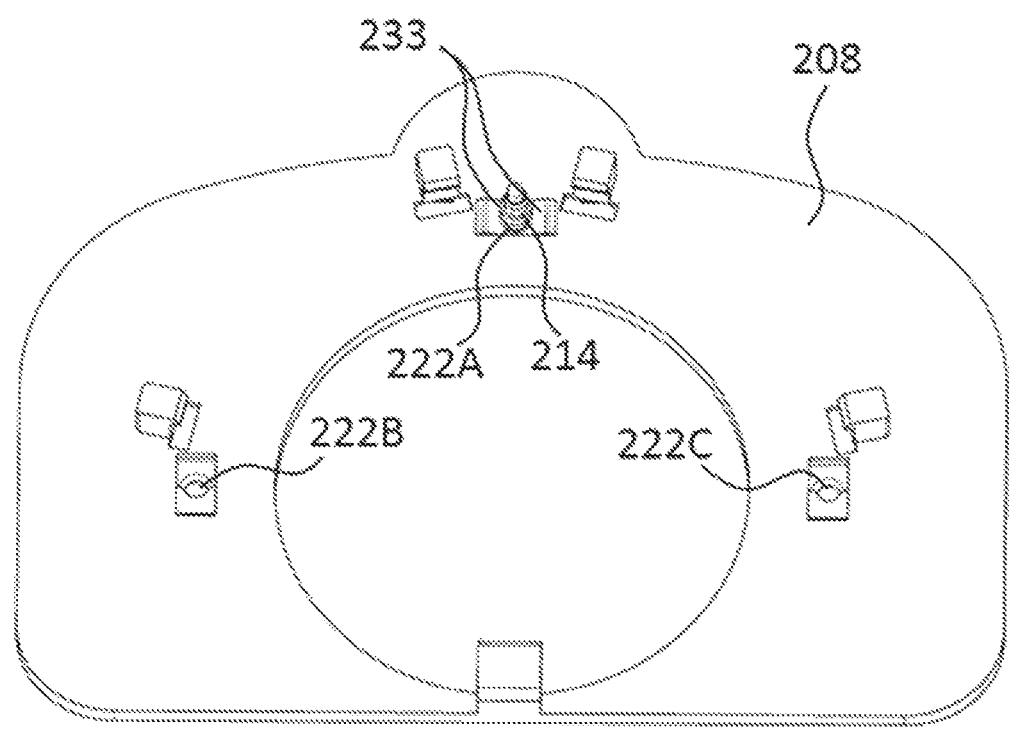
FIG. 10 is an explanatory diagram illustrating a configuration for limiting rotation according to the first embodiment.

FIG. 10 is an explanatory diagram illustrating a configuration for limiting rotation. In this embodiment, rotation is limited by the contact 214 fitting into the hole 222 (222A, 222B, or 222C) of the holder 208. When the user changes the orientation, the contact 214 is made to rotate as the camera main body 100 rotates. However, when the convex portion 225 of the cylindrical portion 226 of the contact 214 overcomes the biasing force of the spring 229 of the contact 214 and climbs over a slope portion 233 of the holder 208, the rotation limitation is cancelled. A description has been given of the vertical position state with a grip on the upper side, but the same applies to a vertical position state with the grip on the lower side.

Second Embodiment

Figure 11:
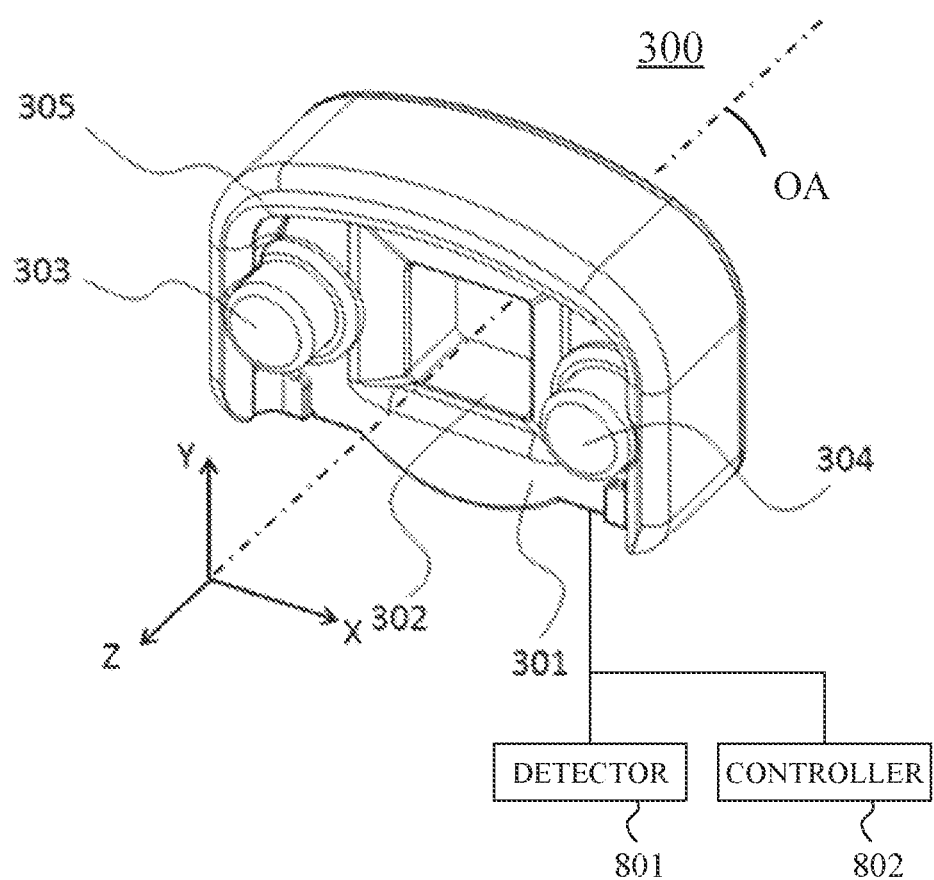
FIG. 11 is a perspective view illustrating an eyecup according to a second embodiment.

Next, the second embodiment of the present invention will be described with reference to FIGS. 11 to 18B. FIG. 11 is a perspective view illustrating an eyecup (accessory) 300 in this embodiment. In FIG. 11, as in the first embodiment, a dot-dash-dot line represents a finder optical axis OA (center of an optical axis of a finder). The finder optical axis OA is defined as a Z axis, a horizontal axis orthogonal to the Z axis which is the finder optical axis OA is defined as an X axis, and a vertical axis orthogonal to the Z axis is defined as a Y axis. Respective+directions of the axes are directions of arrows illustrated in FIG. 11.

An eyepiece part of the eyecup 300 includes a frame member 301, bone conduction units 303 and 304, and a light-shielding wall portion 305. The frame member 301 is formed with an opening 302 through which a user views a finder image. The bone conduction units 303 and 304 are disposed on left and right sides of the opening 302, respectively. When viewing the finder image, the user can obtain audio information from the camera main body 100 by making the vicinity of either the left or right eye in contact with the bone conduction units 303 and 304. The light-shielding wall portion 305 shields the opening 302 from entering light while an image is captured. The bone conduction units 303 and 304 are configured to project in the +Z direction from the light-shielding wall portion 305. Thereby, when the user takes a look into the finder, the bone conduction units 303 and 304 can come into contact with the user before the light-shielding wall portion 305 does.

When the user takes a look into the finder, a position of the face is different depending on whether the user's dominant eye is a right eye or a left eye. In the eyecup 300 in this embodiment, the bone conduction units 303 and 304 are disposed on the left and right sides of the opening 302, respectively. Hence, regardless of whether the user takes a look into the finder with the left or right eye, one bone conduction unit is located in the vicinity of an inner corner of the eye on a nose bridge side of the face, and the other bone conduction unit is located in the vicinity of an outer corner of the eye, and thus vibration is transmitted from the same position to a skull.

Figure 12:
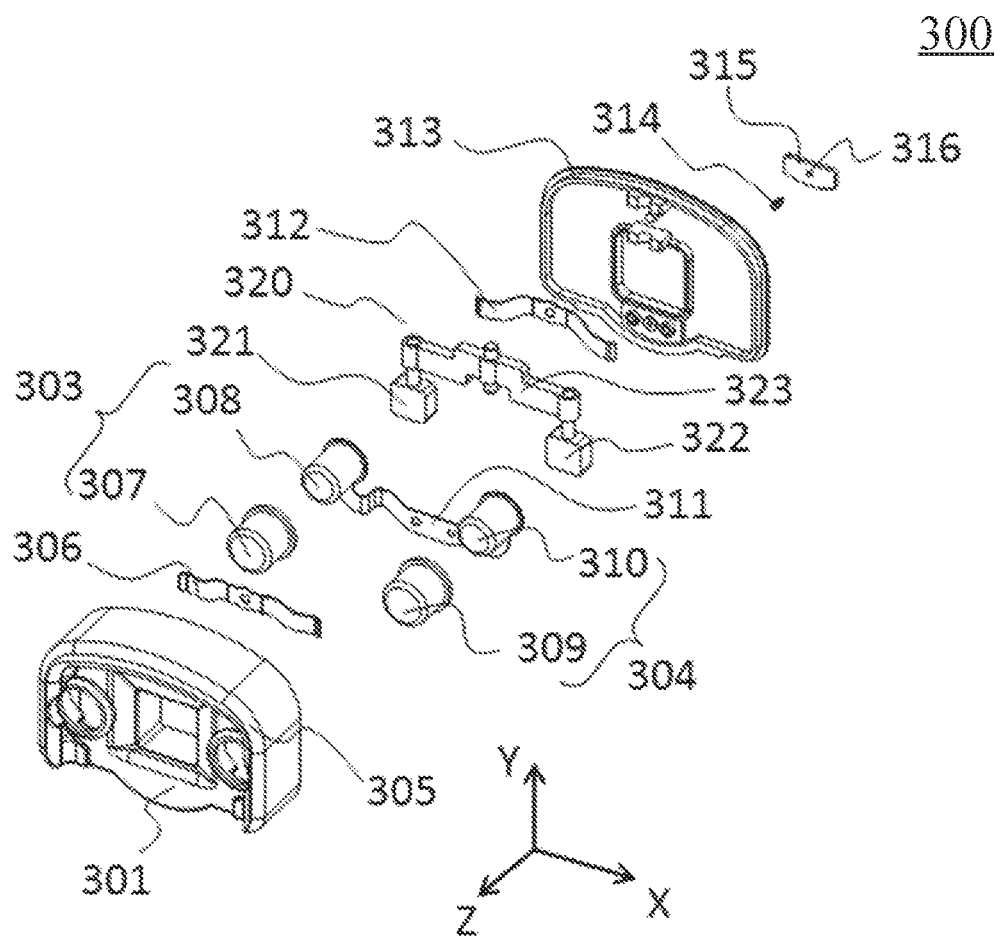
FIG. 12 is an exploded perspective view illustrating the eyecup according to the second embodiment.

The left and right bone conduction units 303 and 304 have a seesaw structure in which when one bone conduction unit is pushed in, the other bone conduction unit comes out. FIG. 12 is an exploded perspective view illustrating the eyecup 300 in this embodiment. As in the first embodiment, the bone conduction units 303 and 304 includes bone conduction speakers 308 and 310 which are mounted on a flexible printed circuit board 311 and give vibration to the skull so that sounds are recognized, and protection caps (protection member) 307 and 309 formed of elastic members. In this embodiment, when the image pickup apparatus 1 is in a normal position state, the bone conduction speaker includes the bone conduction speaker (first speaker) 308 located on the left side of the opening 302 and the bone conduction speaker (second speaker) 310 located on the right side of the opening 302.

An interlocking mechanism unit 320 is disposed on a back side of the bone conduction speakers 308 and 310 mounted on the flexible printed circuit board 311. The interlocking mechanism unit 320 changes a position of one of the bone conduction speakers 308 and 310 based on a position of the other of the bone conduction speakers 308 and 310. The interlocking mechanism unit 320 includes the bone conduction speakers 308 and 310, base portions 321 and 322 for fixing and holding using double-sided tape (not illustrated) or the like, and a main body portion 323. The bone conduction speakers 308 and 310 have structures which can move integrally with the base portions 321 and 322. The interlocking mechanism unit 320 is sandwiched between and held by a leaf spring 306 for biasing the main body portion 323 in the −Z direction and a leaf spring 312 for biasing the main body portion 323 in the +Z direction. The interlocking mechanism unit 320 is held by a back cover 313.

A contact 314 is sandwiched and fixed between the back cover 313 and a contact cover 315, and is electrically connected to a contact pattern (not illustrated) of the flexible printed circuit board 311. Further, the contact 314 passes through a hole 316 of the contact cover 315 and is electrically connected to a contact portion (not illustrated) of the camera main body 100. Thereby, the contact pattern of the flexible printed circuit board 311 and the contact portion of the camera main body 100 are electrically connected via the contact 314.

Figure 13:
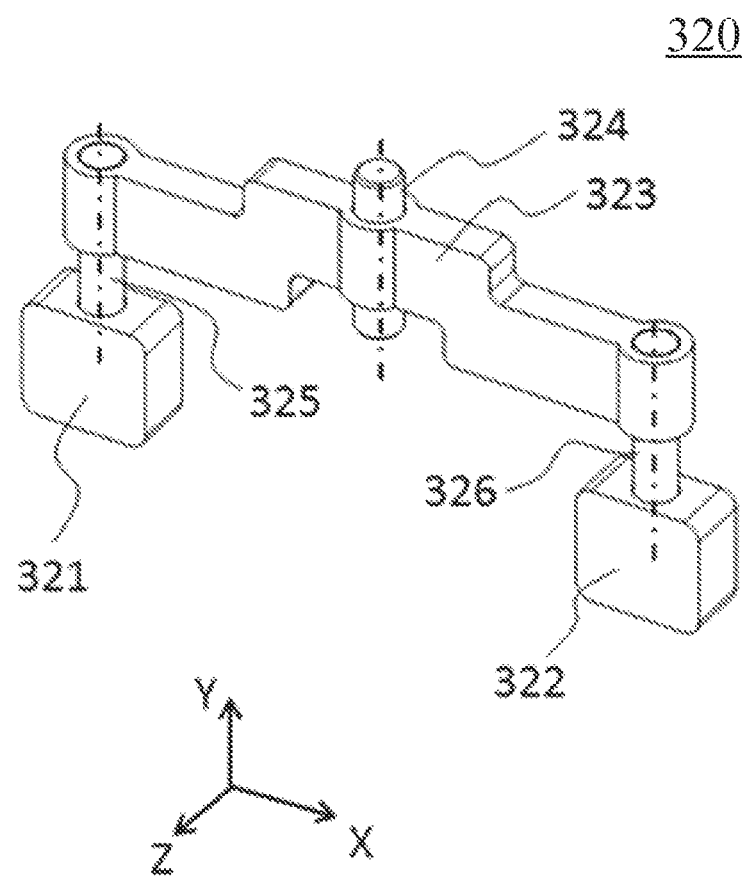
FIG. 13 is a detailed view of an interlocking mechanism unit according to the second embodiment.

FIG. 13 is a detailed view illustrating the interlocking mechanism unit 320. The base portions 321 and 322 of the interlocking mechanism unit 320 are connected to the main body portion 323 by shafts 325 and 326, respectively. The main body portion 323 is rotatably held by a shaft 324. The main body portion 323 is held rotatably with respect to each of the shafts 325 and 326. The base portion 321 is fixed to the shaft 325 and held non-rotatably. Similarly, the base portion 322 is fixed to the shaft 326 and held non-rotatably.

Figure 14A:
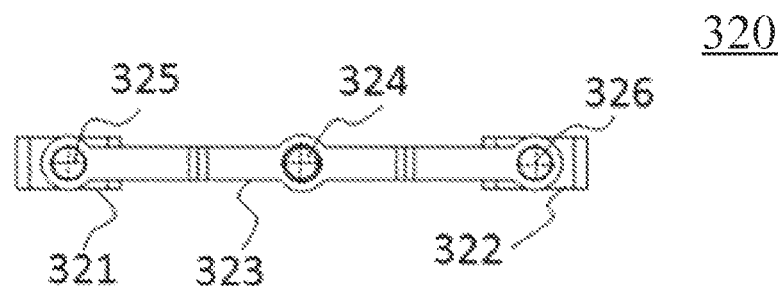
FIGS. 14A to 14C are top views illustrating the interlocking mechanism unit according to the second embodiment.
Figure 14B:
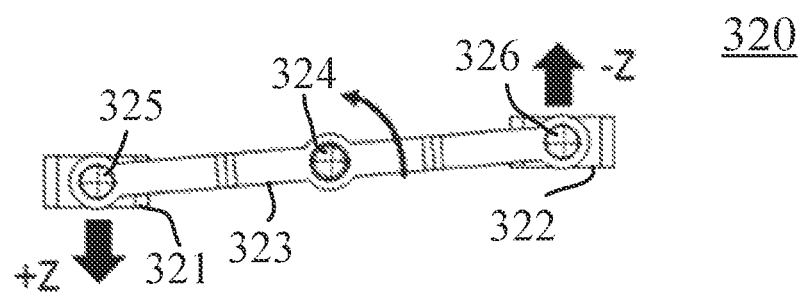
Figure 14C:
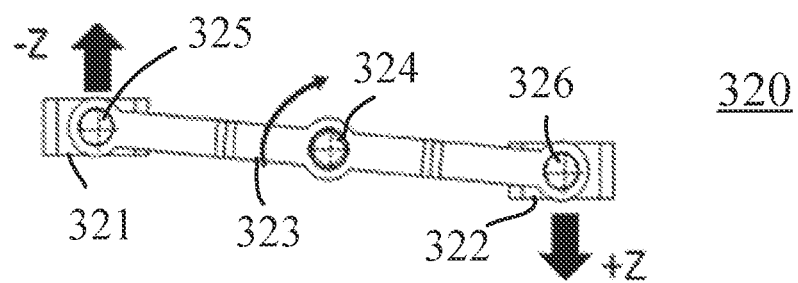

Next, an operation of the interlocking mechanism unit 320 will be described with reference to FIGS. 14A to 14C. FIGS. 14A to 14C are top views illustrating the interlocking mechanism unit 320. FIG. 14A illustrates a state in which the main body portion 323 is not rotated around the shaft 324. FIG. 14B illustrates a state in which the base portion 322 in the state of FIG. 14A has been pressed. When the base portion 322 is pressed and moves in the −Z direction, the main body portion 323 rotates counterclockwise around the shaft 324. Since the shaft 325 is rotatably held by the main body portion 323 and the base portion 321 is movable with respect to the shaft 325, the base portion 321 moves in the +Z direction as illustrated in FIG. 14B. FIG. 14C illustrates a reverse operation of the above. As illustrated in FIGS. 14A to 14C, the interlocking mechanism unit 320 moves like a seesaw in which when one of the base portions (holders) 321 and 322 moves in the −Z direction, the other of the base portions 321 and 322 moves in the Z direction. Here, since the main body portion 323 rotates and moves, the base portions 321 and 322 move technically not only in the Z direction but also in the X direction. However, a moving amount in the X direction is very small as compared to that in the Z direction, and thus the description thereof is simplified. Actually, if necessary, hole portions of the main body portion 323 rotatably holding the shafts 325 and 326 may be made elongated holes.

Figure 15:
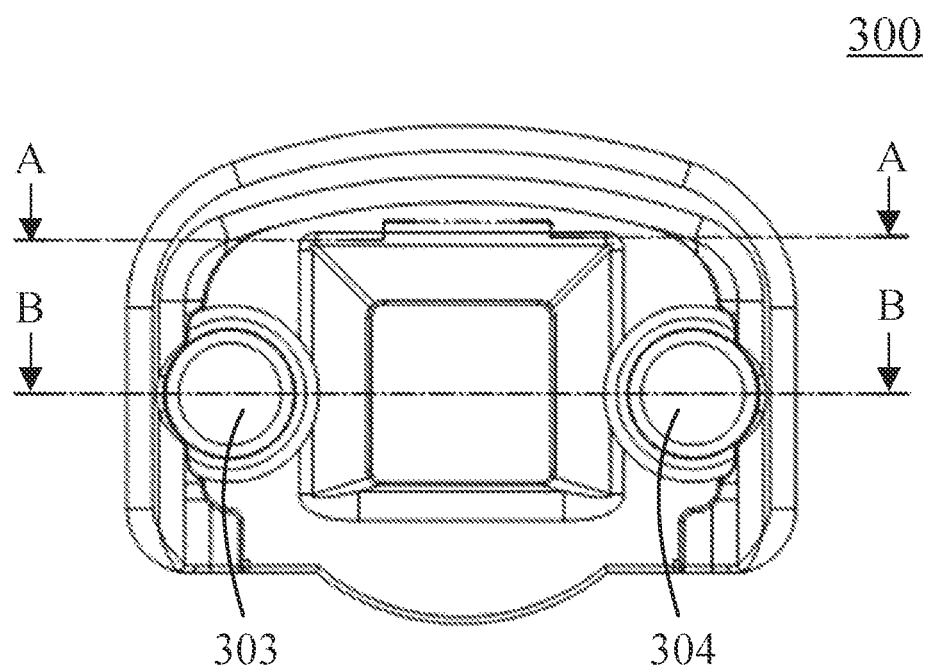
FIG. 15 is a front view illustrating the eyecup according to the second embodiment.
Figure 16A:
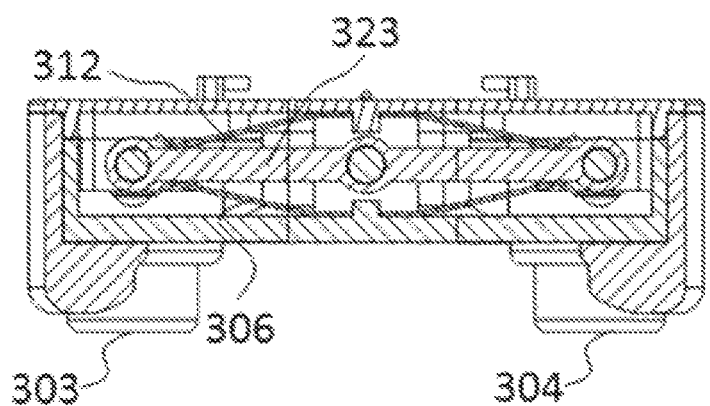
FIGS. 16A and 16B are sectional views along a line AA and a line BB in FIG. 15
Figure 16B:
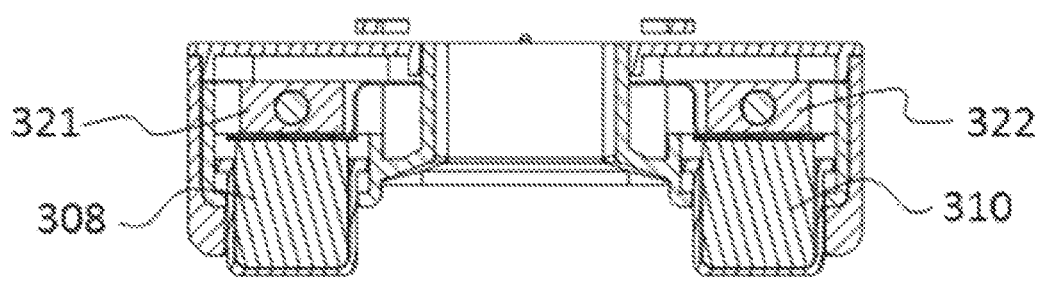

Next, a description will be given of operations of the bone conduction units 303 and 304 of the eyecup 300 which includes the interlocking mechanism unit 320 inside with reference to FIGS. 15 to 17B. FIG. 15 is a front view of the eyecup 300. FIG. 16A is a sectional view along a line AA in FIG. 15, and FIG. 16B is a sectional view along a line BB in FIG. 15. As illustrated in FIG. 16A, in a state in which none of the bone conduction units 303 and 304 is pressed, the main body portion 323 is in a state of being evenly biased from the front and back by the leaf springs 306 and 312. Therefore, the positions in the Z direction of the bone conduction units 303 and 304 are substantially the same.

Figure 17A:
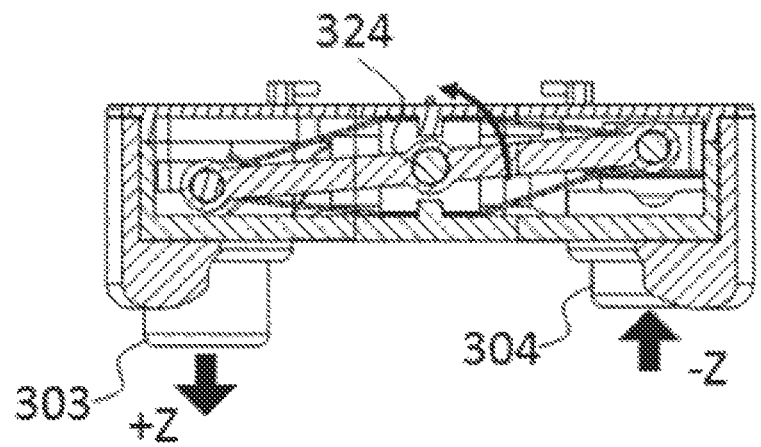
FIGS. 17A and 17B are sectional views viewed with a right eye, corresponding to FIGS. 16A and 16B.
Figure 17B:
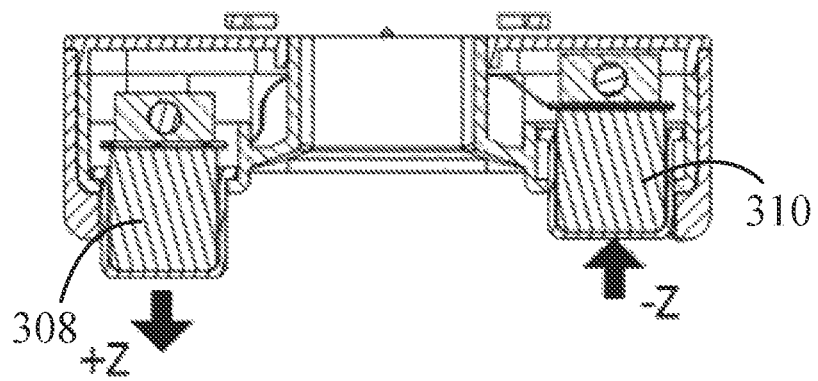

FIGS. 17A and 17B correspond to the sectional views of FIGS. 16A and 16B, respectively, and are diagrams illustrating the positions of the bone conduction units 303 and 304 when the user takes a look into the finder with the left eye. When the user takes a look with the left eye, the bone conduction unit 304 comes into contact with and pressed against the vicinity of the inner corner of the left eye and the nose bridge, and moves in the −Z direction. At this time, the bone conduction unit 303 is moved in the +Z direction via the interlocking mechanism unit 320, and certainly comes into contact with the vicinity of the outer corner of the eye and temples of the face. When the user takes the eye off the finder, the bone conduction units 303 and 304 automatically return to the positions illustrated in FIGS. 16A and 16B by the biasing force of the leaf springs 306 and 312.

Figure 18A:
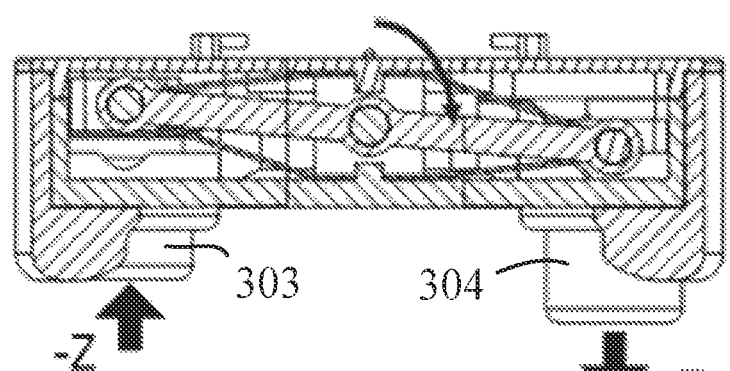
FIGS. 18A and 18B are sectional views viewed with a left eye, corresponding to FIGS. 16A and 16B.
Figure 18B:
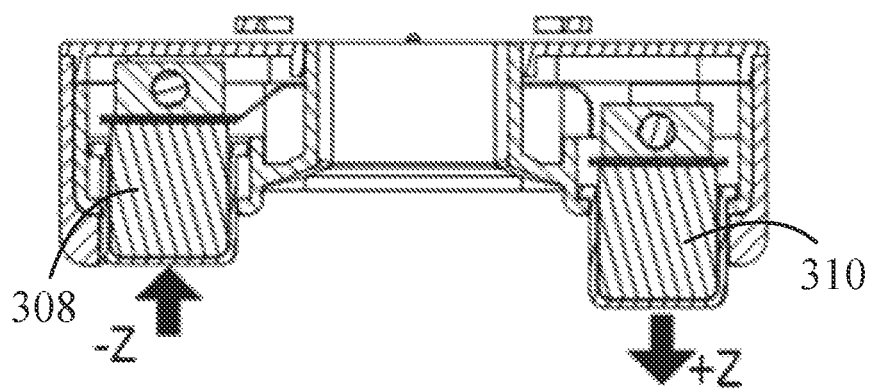

Similarly, FIGS. 18A and 18B are diagrams illustrating the positions of the bone conduction units 303 and 304 when the user takes a look into the finder with the right eye. When the user takes a look with the right eye, the bone conduction unit coming into contact with the face is opposite to that when the user takes a look with the left eye. That is, regardless of whether the user takes a look into the finder with the left or right eye, the bone conduction units 303 and 304 certainly come into contact with the same positions. The amount of unevenness from the inner corner to outer corner of the eye in the user's face varies widely. However, when a seesaw configuration is included inside as in this embodiment, it is possible to certainly make the bone conduction units 303 and 304 come into contact with the face even if the amount of unevenness from the inner corner to outer corner of the eye varies depending on the users.

One, which is protruding, of the bone conduction units comes into contact with the vicinity of the temples of the face regardless of the dominant eye. When the bone conduction unit is in contact with the temples, vibration can be certainly transmitted to the skull and the sound can be recognized. Hence, in this embodiment, the camera main body 100 may have a detector (position detection sensor) 801 and a controller 802 as illustrated in FIG. 11. The detector 801 detects the position of at least one of the bone conduction speakers 308 and 310. The controller 802 controls vibration of at least one of the bone conduction speakers 308 and 310 based on a signal from the detector 801. Thereby, the detector 801 can detect one bone conduction unit of the bone conduction units 303 and 304, which is protruding and in contact with the temples, and the controller 802 can control the bone conduction unit that vibrates based on the detection signal from the detector 801. Since the bone conduction unit is in contact with the vicinity of the temples, vibration can be certainly transmitted to the skull, and when one bone conduction unit vibrates, it is more advantageous in terms of power as compared with a case when two bone conduction units vibrate.

Third Embodiment

Figure 19:
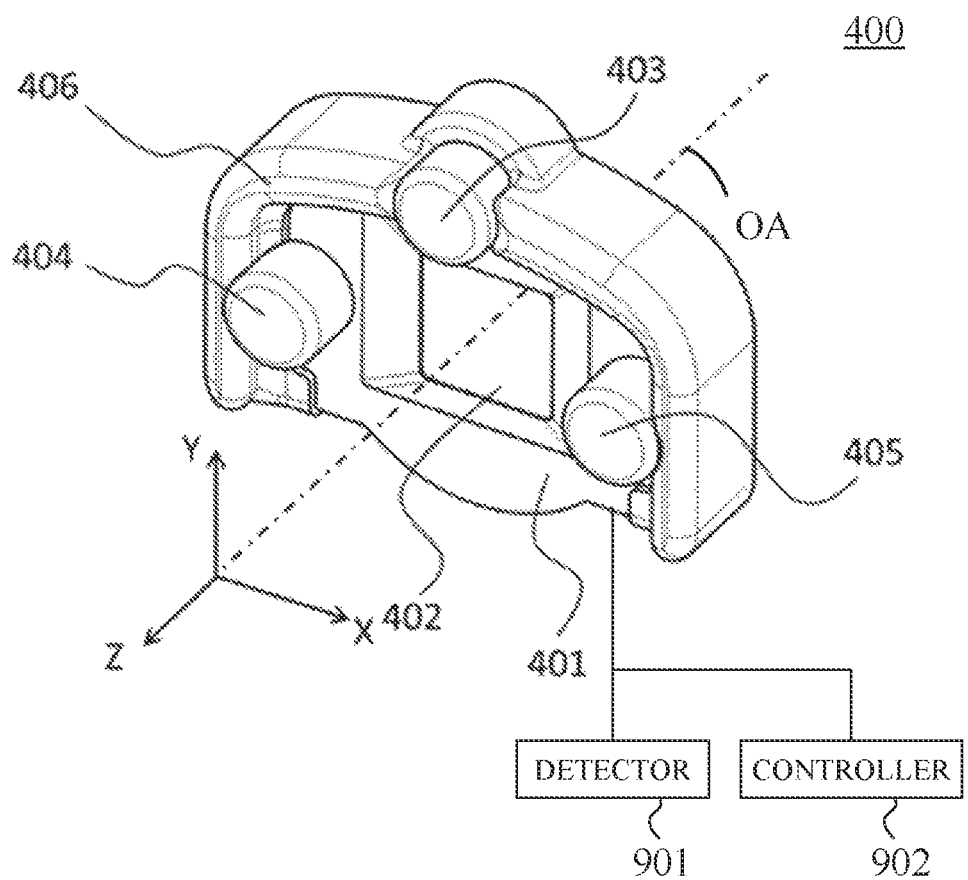
FIG. 19 is a perspective view illustrating an eyecup according to a third embodiment.

Next, the third embodiment of the present invention will be described with reference to FIGS. 19 to 21. FIG. 19 is a perspective view illustrating an eyecup (accessory) 400 in this embodiment. In FIG. 19, as in the first embodiment, a dot-dash-dot line represents a finder optical axis OA (center of an optical axis of a finder). The finder optical axis OA is defined as a Z axis, a horizontal axis orthogonal to the Z axis which is the finder optical axis OA is defined as an X axis, and a vertical axis orthogonal to the Z axis is defined as a Y axis. Respective+directions of the axes are directions of arrows illustrated in FIG. 19.

An eyepiece part of the eyecup 400 includes a frame member 401, bone conduction units 403, 404, and 405, and a light-shielding wall portion 406. An opening 402 is formed on the frame member 401. The bone conduction units 403, 404, and 405 are disposed on an upper side, a left side, and a right side of the opening 402, respectively.

Figure 20A:
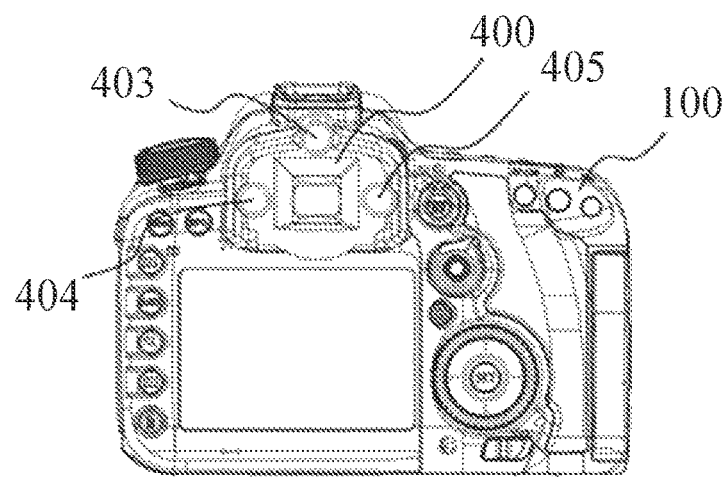
FIGS. 20A to 20C are diagram illustrating a relationship between a camera main body and the eyecup in respective orientations of a normal position state and vertical position states according to the third embodiment.
Figure 20B:
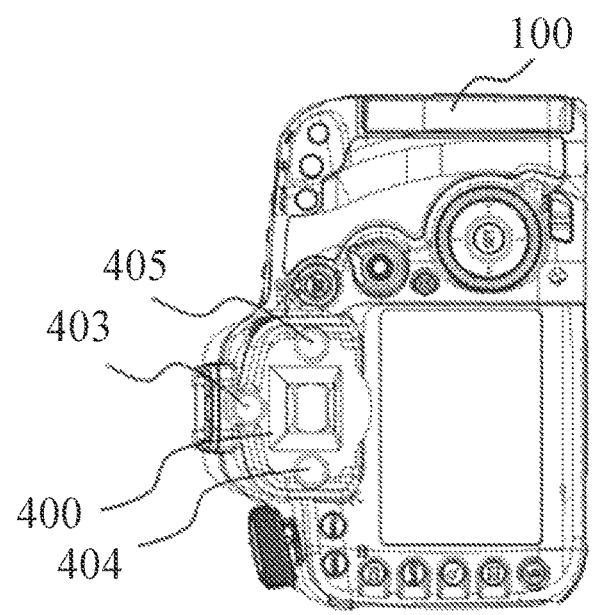
Figure 20C:
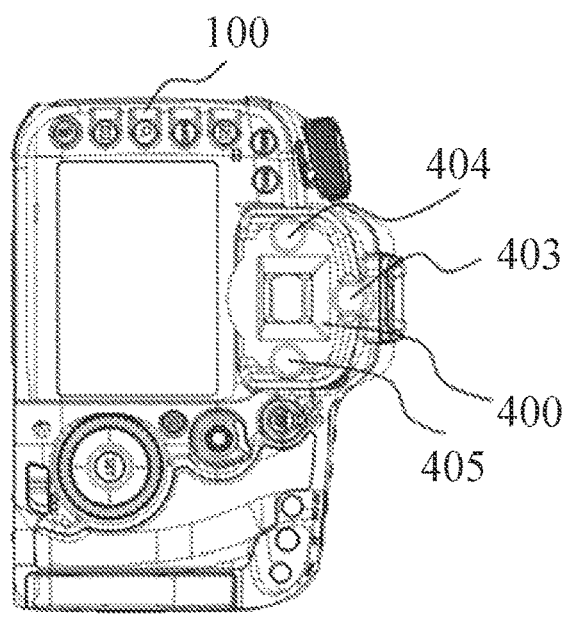

FIGS. 20A to 20C are diagrams illustrating a relationship between a camera main body 100 and the eyecup 400 in respective orientations of a normal position state and vertical position states. FIG. 20A illustrates the normal position state, FIG. 20B illustrates a first vertical position state in which a grip of the camera main body 100 is located at the upper side, and FIG. 20C illustrates a second vertical position state in which the grip of the camera main body 100 is located at the lower side. The camera main body 100 and the eyecup 400 are provided with contact portions, respectively, and when the contact portions come into contact with each other, they are electrically connected and information can be transmitted from the camera main body 100 to the eyecup 400.

In the normal position state illustrated in FIG. 20A, when viewing a finder image, a user obtains audio information from the camera main body 100 by making the upper part of the eye in contact with the bone conduction unit 403. In the first vertical position state illustrated in FIG. 20B, when viewing the finder image, the user obtains the audio information from the camera main body 100 by making the upper part of the eye in contact with the bone conduction unit 405. In the second vertical position state illustrated in FIG. 20C, when viewing the finder image, the user obtains the audio information from the camera main body 100 by making the upper part of the eye in contact with the bone conduction unit 404.

Figure 21:
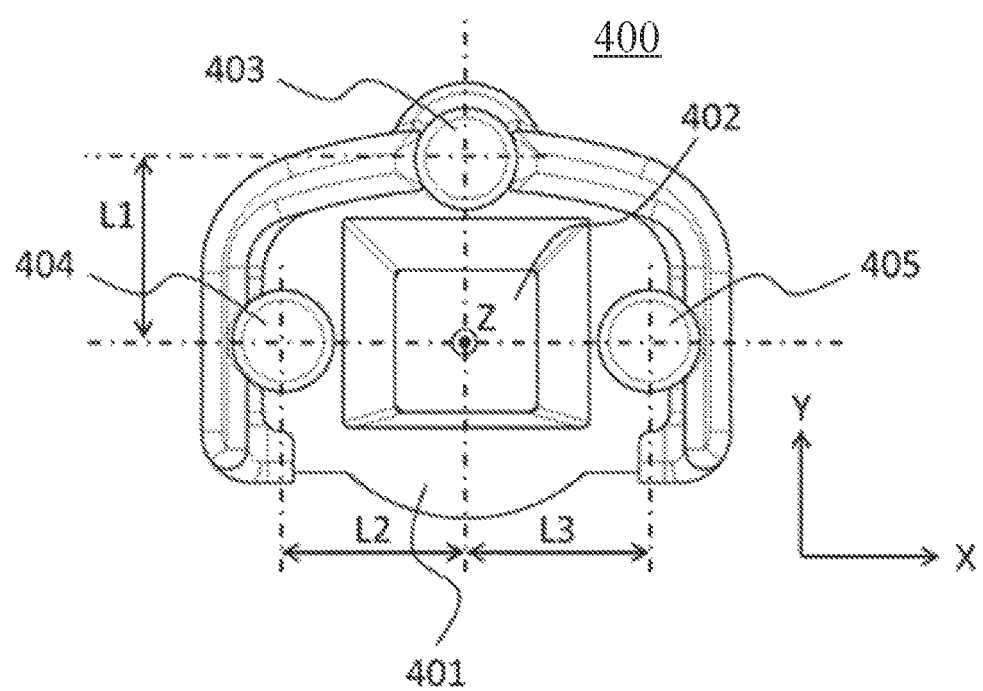
FIG. 21 is a front view illustrating the eyecup according to the third embodiment.

FIG. 21 is a front view of the eyecup 400 in this embodiment. The bone conduction units 403, 404, and 405 are disposed so that distances (first distance, second distance, and third distance) L1, L2, and L3 from the Z axis which is the finder optical axis OA are substantially equal to each other. The bone conduction unit 403 located on the upper side in the normal position state of the camera is disposed so that its position in the X direction is substantially the same as that of the Z axis which is the finder optical axis OA. The bone conduction units 404 and 405 located on the left and right in the normal position state of the camera are disposed so that their positions in the Y direction are substantially the same as that of the Z axis which is the finder optical axis OA. Thus, in the normal position state and the vertical position states, the respective positions that come into contact with the upper part of the user's eyes are almost the same positions, so that the user can obtain audio information in a stable manner.

As described above, the eyecup 400 in this embodiment includes the bone conduction unit (first speaker) 403, the bone conduction unit (second speaker) 404, and the bone conduction unit (third speaker) 405 disposed on the upper side, the right side, and the left side of the opening 402 in the normal position state, respectively. The respective distances (first distance, second distance, and third distance) L1, L2, and L3 between the bone conduction units 403, 404, and 405 and the center of the optical axis of the finder may be substantially equal to each other. Further, the bone conduction unit 403 may be disposed on substantially the same position as the center of the optical axis of the finder in the horizontal direction (width direction) of the image pickup apparatus, and the bone conduction units 404 and 405 may be disposed on substantially the same position as the center of the optical axis of the finder in the vertical direction (height direction) of the image pickup apparatus.

The camera main body 100 in this embodiment may include a detector (position detection sensor) 901 configured to detect the position (normal position state or horizontal position state) of the camera main body 100, and a controller 902 configured to control vibration of the bone conduction speaker (bone conduction units 403, 404, and 405). The controller 902 vibrates the bone conduction unit 403 when the detector 901 detects that the camera main body 100 is in the normal position state (horizontal position state). On the other hand, when the detector 901 detects that the camera main body 100 is in the vertical position state, the controller 902 vibrates one, which is located on the upper side in the vertical position state, of the bone conduction unit 404 and the bone conduction unit 405. As described above, in this embodiment, the camera main body 100 can detect the position of the camera main body 100 by having the detector 901. Thereby, based on the position of the camera main body 100, it is possible to always drive at least the bone conduction unit that is in contact with the upper part of the user's eye, and the user can stably obtain audio information. It is also possible to drive only the bone conduction unit in contact with the upper part of the user's eye and not to drive the other bone conduction units, which can save power consumption.

The configuration of each embodiment can ensure that the bone conduction unit comes into contact with part of the user's face. Therefore, according to each embodiment, it is possible to provide an image pickup apparatus and an accessory each of which can certainly make the bone conduction speaker in contact with the user's face.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, in each embodiment, a description has been given of the configuration in which the bone conduction speaker is disposed on the eyecup which is detachably attachable to the camera main body, but the bone conduction speaker in each embodiment can also be applied to a finder unit which is not detachably attachable to the camera main body.

What is claimed is:

1. An image pickup apparatus comprising:
a camera main body;
an eyepiece portion for viewing an object image; and
a frame member having an opening through which light of the object image passes,
wherein the eyepiece portion includes a bone conduction speaker, and
wherein the eyepiece portion is rotatable around a center of an optical axis of a finder of the image pickup apparatus.

2. An image pickup apparatus comprising:
a camera main body;
an eyepiece portion for viewing an object image; and
a frame member having an opening through which light of the object image passes,
wherein the eyepiece portion includes a bone conduction speaker, and
wherein when the image pickup apparatus is in a normal position state, the bone conduction speaker is located on an upper side of the opening.

3. An image pickup apparatus comprising:
a camera main body;
an eyepiece portion for viewing an object image; and
a frame member having an opening through which light of the object image passes,
wherein the eyepiece portion includes a bone conduction speaker, and
wherein when the image pickup apparatus is in a normal position state, the bone conduction speaker includes a first speaker located on a left side of the opening and a second speaker located on a right side of the opening.

4. The image pickup apparatus according to claim 3, further comprising an interlocking mechanism unit configured to change, based on a position of one of the first speaker and the second speaker, a position of the other of the first speaker and the second speaker.

5. The image pickup apparatus according to claim 3, further comprising:
  a detector configured to detect a position of at least one of the first speaker and the second speaker; and
  a controller configured to control vibration of at least one of the first speaker and the second speaker based on a signal from the detector.

6. An image pickup apparatus comprising:
  a camera main body;
  an eyepiece portion for viewing an object image; and
  a frame member having an opening through which light of the object image passes,
  wherein the eyepiece portion includes a bone conduction speaker, and
  wherein when the image pickup apparatus is in a normal position state, the bone conduction speaker includes a first speaker located on an upper side of the opening, a second speaker located on a left side of the opening, and a third speaker located on a right side of the opening.

7. The image pickup apparatus according to claim 6,
  wherein a first distance between the first speaker and a center of an optical axis of a finder of the image pickup apparatus, a second distance between the second speaker and the center of the optical axis of the finder, and a third distance between the third speaker and the center of the optical axis of the finder are equal to each other.

8. The image pickup apparatus according to claim 6,
  wherein in a horizontal direction of the image pickup apparatus, the first speaker is located on a same position as a position of a center of an optical axis of a finder of the image pickup apparatus, and
  wherein in a vertical direction of the image pickup apparatus, the second speaker and the third speaker are located on a same position as the position of the center of the optical axis of the finder.

9. The image pickup apparatus according to claim 6, further comprising:
  a detector configured to detect a position of the image pickup apparatus; and
  a controller configured to control vibration of the bone conduction speaker,
  wherein the controller is configured to
    vibrate the first speaker when the detector detects that the image pickup apparatus is in a normal position state, and
    vibrate one, which is located on the upper side in a vertical position state, of the second speaker and the third speaker when the detector detects that the image pickup apparatus is in the vertical position state.

10. An image pickup apparatus comprising:
  a camera main body;
  an eyepiece portion for viewing an object image; and
  a frame member having an opening through which light of the object image passes,
  wherein the eyepiece portion includes a bone conduction speaker,
  wherein the eyepiece portion includes a bone conduction unit and a light-shielding wall portion,
  wherein the bone conduction unit includes the bone conduction speaker and a protection member configured to protect the bone conduction speaker, and
  wherein the light-shielding wall portion shields the opening so that light does not enter the opening.

11. The image pickup apparatus according to claim 10,
  wherein when a user views the object image, the bone conduction unit is configured to come into contact with an upper part of a user's eye, and to transmit audio information from the image pickup apparatus to the user.

12. An accessory detachably attachable to an image pickup apparatus, comprising:
  an eyepiece portion for viewing an object image; and
  a frame having an opening through which light of the object image passes,
  wherein the eyepiece portion includes a bone conduction speaker, and
  wherein the eyepiece portion is rotatable around a center of an optical axis of a finder of the image pickup apparatus.

13. An accessory detachably attachable to an image pickup apparatus, comprising:
  an eyepiece portion for viewing an object image; and
  a frame having an opening through which light of the object image passes,
  wherein the eyepiece portion includes a bone conduction speaker, and
  wherein when the image pickup apparatus is in a normal position state, the bone conduction speaker is located on an upper side of the opening.

14. An accessory detachably attachable to an image pickup apparatus, comprising:
  an eyepiece portion for viewing an object image; and
  a frame having an opening through which light of the object image passes,
  wherein the eyepiece portion includes a bone conduction speaker, and
  wherein when the image pickup apparatus is in a normal position state, the bone conduction speaker includes a first speaker located on a left side of the opening and a second speaker located on a right side of the opening.

15. The accessory according to claim 14, further comprising an interlocking mechanism unit configured to change, based on a position of one of the first speaker and the second speaker, a position of the other of the first speaker and the second speaker.

16. The accessory according to claim 14, further comprising:
  a detector configured to detect a position of at least one of the first speaker and the second speaker; and
  a controller configured to control vibration of at least one of the first speaker and the second speaker based on a signal from the detector.

17. An accessory detachably attachable to an image pickup apparatus, comprising:
  an eyepiece portion for viewing an object image; and
  a frame having an opening through which light of the object image passes,
  wherein the eyepiece portion includes a bone conduction speaker, and
  wherein when the image pickup apparatus is in a normal position state, the bone conduction speaker includes a first speaker located on an upper side of the opening, a second speaker located on a left side of the opening, and a third speaker located on a right side of the opening.

18. The accessory according to claim 17,
  wherein a first distance between the first speaker and a center of an optical axis of a finder of the image pickup apparatus, a second distance between the second speaker and the center of the optical axis of the finder, and a third distance between the third speaker and the center of the optical axis of the finder are equal to each other.

19. The accessory according to claim 17,
wherein in a horizontal direction of the image pickup apparatus, the first speaker is located on a same position as a position of a center of an optical axis of a finder of the image pickup apparatus, and
wherein in a vertical direction of the image pickup apparatus, the second speaker and the third speaker are located on a same position as the position of the center of the optical axis of the finder.

20. The accessory according to claim 17, further comprising:
a detector configured to detect a position of the image pickup apparatus; and
a controller configured to control vibration of the bone conduction speaker,
wherein the controller is configured to
vibrate the first speaker when the detector detects that the image pickup apparatus is in a normal position state, and
vibrate one, which is located on the upper side in a vertical position state, of the second speaker and the third speaker when the detector detects that the image pickup apparatus is in the vertical position state.

21. An accessory detachably attachable to an image pickup apparatus, comprising:
an eyepiece portion for viewing an object image; and
a frame having an opening through which light of the object image passes,
wherein the eyepiece portion includes a bone conduction speaker,
wherein the eyepiece portion includes a bone conduction unit and a light-shielding wall portion,
wherein the bone conduction unit includes the bone conduction speaker and a protection member configured to protect the bone conduction speaker, and
wherein the light-shielding wall portion shields the opening so that light does not enter the opening.

22. The accessory according to claim 21,
wherein when a user views the object image, the bone conduction unit is configured to come into contact with an upper part of a user's eye, and to transmit audio information from the image pickup apparatus to the user.

* * * * *